Patented Oct. 18, 1932

1,883,447

UNITED STATES PATENT OFFICE

IRVIN G. AMMEN, OF YONKERS, NEW YORK, ASSIGNOR TO INTERNATIONAL AGRICULTURAL CORPORATION, OF NEW YORK, N. Y., A CORPORATION OF NEW YORK

PROCESS OF TREATING TRISODIUM PHOSPHATE CRYSTALS

No Drawing. Application filed February 4, 1929. Serial No. 337,524.

This invention relates to a process of treating trisodium phosphate crystals, so that they will remain in a free flowing condition, without caking.

When trisodium phosphate crystals are precipitated from a solution in the course of manufacture of the same by the well known method, the crystals are made up of molecules containing twelve molecules of water of crystallization in accordance with the formula $Na_3PO_4.12H_2O$. When the crystals are fresh they have a blue white glistening appearance. They do not appear to be hygroscopic, but warm air or air of high humidity tends to break down the outer surface of the crystals, causing them to become moist and stick together. The moisture disappears in a dry atmosphere, thus causing the mass to form a cake and remain in the caked condition until reworked or ground. After the trisodium phosphate has caked and then been reconditioned by breaking up and screening the same, the product remains free flowing in most instances under extreme atmospheric conditions of summer temperature and humidity. The physical appearance of the crystals undergoes a change in color, becoming chalk white instead of retaining a blue white glistening appearance. The chalk white appearance appears to be due to a coating of partially dehydrated trisodium phosphate upon the crystals, some of the water of crystallization having been lost. In view of the fact that it is very desirable to keep the material in a free flowing condition, other methods have been resorted to in the attempt to accomplish this result, besides that of permitting them to cake and breaking up the cake.

One of the methods used for this purpose was that of over-drying the trisodium phosphate crystals by driving off some of the water of crystallization at an elevated temperature, after all of the mechanically adhering water had been dried off. An objection to this method has been that it is a delicate and expensive operation, because by driving off some of the water of crystallization the phosphorous pentoxide content was increased proportionately. Also, it was practically impossible with varying atmospheric conditions from day to day to drive off the proper amount of water of crystallization in order to obtain consistent results all the time.

The trisodium phosphate crystals have also been prepared to keep the same free flowing by permitting the crystals to "cure" by storing them in a dry cool place for months after the mechanically adhering water had been dried off. This produces the same sort of result as the over-drying method, since the water of crystallization was thereby gradually lost from the surfaces of the crystals during the long period of storage. This method is, however, expensive, because large stocks have to be carried and requires much labor in handling.

By the present invention the trisodium phosphate crystals are prepared so that they will remain free flowing, without requiring a large expenditure of time and labor. The present invention not only conditions the crystals so that they will retain their free flowing property, but will enable the same to be mixed with other materials, such as ammonium chloride, for example, and still remain free flowing. The trisodium phosphate crystals prepared in accordance with this invention can be marketed for cleaning purposes, for example, and will have the non-caking property, without incurring a large expense or requiring extraordinary precautions.

In carrying out the invention the trisodium phosphate crystals are coated with a coating which accomplishes a result similar to that which is obtained by causing the surfaces of the crystals to become dehydrated by the over-drying and curing processes, and at the same time the present process is cheaper and can be more easily and accurately controlled than the prior processes for conditioning the crystals to keep them free flowing. The coating used in this process may be either organic or inorganic material, such as sodium silicate, sodium carbonate, sodium bicarbonate, sodium sulphate, sodium tartrate, sodium caseinate, magnesium sulphate, carbon dioxide, arrowroot, starch, etc., or mixtures of two or more of them.

The coating may be applied to the crystals at practically any point after crystallization has taken place. A very convenient point to apply the coating is in the centrifuge where the crystals are separated from their mother liquor.

When sodium silicate, which I have found thus far to be preferable for this process, is used, a solution of it may be sprayed upon the centrifuge charge of crystals or the crystals may be saturated with the sodium silicate solution of the desired density and the excess discharged before the crystals are removed from the centrifuge. A sodium silicate solution of about one and six hundredths (1.06) density has been found suitable, although the density can be varied over wide ranges. After the crystals have been removed from the centrifuge and dried, they are coated and present a chalk white appearance, similar to the crystals produced by the tedious over-drying or long time curing processes.

In addition to the fact that the sodium silicate coating effectively prevents the trisodium phosphate crystals from caking, another advantage is obtained by the use of the sodium silicate. The mixture of the excess sodium silicate solution with the trisodium phosphate mother liquor that was removed from the surfaces of the crystals may be used in the trisodium phosphate mother liquor storage tanks to effect a very advantageous result. It has been found that when this mixture is added to the trisodium phosphate solution it materially aids in crystallization of the trisodium phosphate crystals, increasing the yield of the crystals from a given amount of the liquor and also producing a better type of crystals. The addition of the sodium silicate from the crystal treating step to the trisodium phosphate solution removes the excess of soluble impurities in the solution that would otherwise interfere with the crystallization of the trisodium phosphate. These impurities comprise iron and aluminum salts, sodium chloride, sodium sulphate, etc. and organic material. The sodium sulphate impurity especially is often present in considerable amounts and interferes seriously with the crystallization of the trisodium phosphate crystals, unless removed. The sodium silicate appears to react with the impurities and especially with the sodium sulphate to form a complicated complex silicate, thereby removing the retarding effect of the impurities to crystallization, thereby improving crystallizing conditions, increasing the yield and forming a superior type of crystal.

I have also found that the trisodium phosphate crystals can be treated with gaseous carbon dioxide to form coats on the crystals that will prevent the same from caking. The gaseous carbon dioxide is brought into contact with the finished trisodium phosphate crystals for this purpose, whereupon the carbon dioxide combines with alkali of the trisodium phosphate crystals thereby forming a coating of sodium carbonate on the crystals or even sodium bicarbonate when the treatment is continued for a sufficiently long time. The carbon dioxide that is used for this purpose may be obtained, for example, as a by-product from the discharged gases that are expelled when phosphoric acid is treated with sodium carbonate in the regular process of manufacturing trisodium phosphate.

I claim:

1. The process which comprises crystallizing trisodium phosphate from a solution, removing excess mother liquor, washing the crystals with a sodium silicate solution, and transferring the liquid from the washing step to the trisodium phosphate solution.

2. The process which comprises crystallizing trisodium phosphate from a solution, removing excess mother liquor, washing the crystals with a sodium silicate solution, and transferring the mixture of sodium silicate and trisodium phosphate mother liquor thereby obtained to the trisodium phosphate solution.

IRVIN G. AMMEN.